June 21, 1927.
R. E. WILLIAMS
1,632,812
AUTOMOBILE LICENSE CARD HOLDER
Filed Dec. 14, 1926
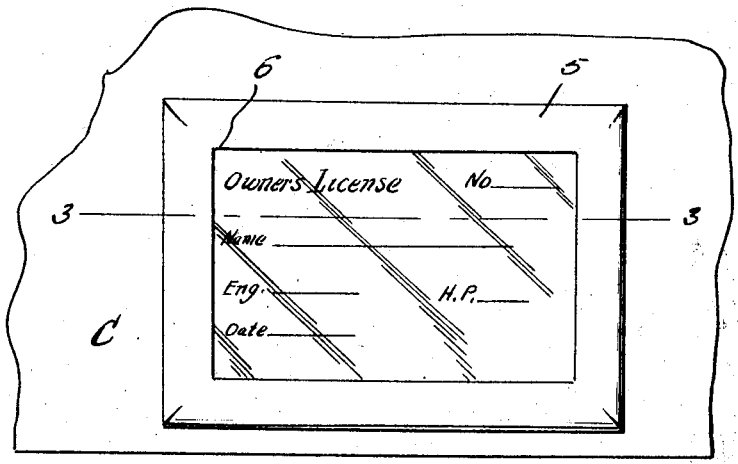
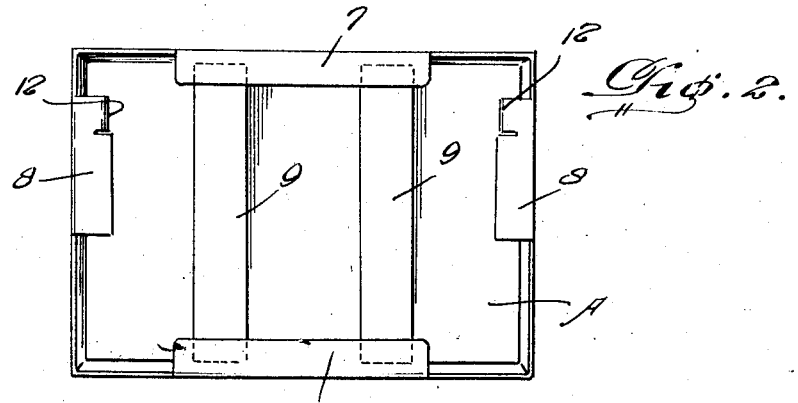
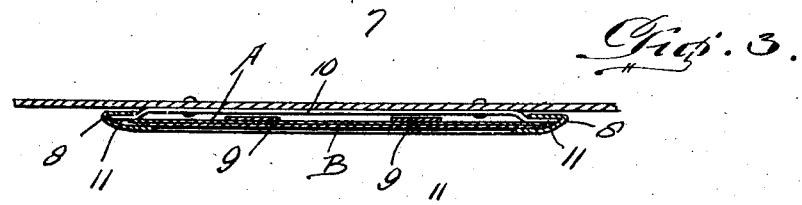
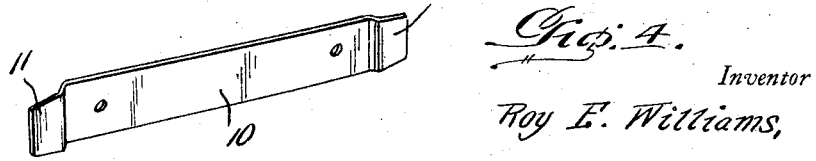
Inventor
Roy E. Williams,
By Clarence A. O'Brien
Attorney Patented June 21, 1927.

1,632,812

UNITED STATES PATENT OFFICE.

ROY E. WILLIAMS, OF RINGTOWN, PENNSYLVANIA.

AUTOMOBILE LICENSE-CARD HOLDER.

Application filed December 14, 1926. Serial No. 154,708.

This invention relates to holders for automobile registration certificates, operators' permits, and the like, and has for its primary object to provide a holder together with a mounting means therefor whereby said certificates or license cards may be properly disposed upon the instrument board, or other suitable point within an automobile, so that the same will be readily visible and so that the certificate or card may be permanently disposed within the automobile to the end that the same will not become lost or inadvertently misplaced or left at home by the owner or driver of the automobile.

A most important object of the invention is to provide a holder of this character wherein the registration certificate or license card may be readily removed therefrom, and wherein the same will be protected against the weather and against wear.

With the foregoing and other objects in view, as the nature of the invention will be better understood, the same comprises the novel form, combination and arrangement of parts hereinafter more fully described, shown in the accompanying drawing and claimed.

In the drawing wherein like numerals indicate like parts throughout the several views:

Figure 1 is a front elevation of a holder constructed in accordance with the present invention, the same being shown as disposed upon the instrument board of an automobile and having arranged therein an owner's license card.

Figure 2 is a rear elevation of the holder per se.

Figure 3 is a detail longitudinal section taken substantially upon the line 3—3 of Figure 1 for more clearly disclosing the manner of association of the holder with respect to said instrument board, and Figure 4 is a perspective of the mounting strip of the holder constructed for rigid attachment to said automobile instrument board.

Now having particular reference to the drawing, my novel invention consists of a substantially rectangular shaped frame 5 of metal or other suitable rigid material having a similar shaped opening 6 through which the license card or registration certificate may be viewed. The upper and lower longitudinal edges of the frame 5 are formed with inwardly extended relatively elongated tongues or strips 7—7, while the opposite vertical edges of the frame are also formed with inwardly extending vertical tongues or strips 8—8. The frame 5 is constructed for receiving the license card or registration certificate A visible through the opening 6 in the frame, and in front of which is disposed a similar shaped strip of mica or other transparent material B for protecting the certificate or card from the weather, it being noted from a consideration of Figures 2 and 3, that said card or certificate as well as the transparent strip are arranged within the frame 5 in back of the longitudinal and vertical edge tongues or strips 7—7 and 8—8, respectively. After the card or certificate together with the transparent strip have been disposed within the same, a pair of strips of rigid material 9—9 are disposed at their opposite ends in back of the longitudinal tongues or strips 7—7 of the frame 5 for rigidly securing the card or certificate within the frame.

The invention further consists of a supporting bar 10 in the form of a length of sheet metal having openings therein to facilitate the securing of the same to the instrument board C of the vehicle or some other convenient place within the vehicle. The ends of this strip of metal are offset outwardly for providing lugs 11—11 over which the vertical tongues or strips 8—8 of the frame 5 may be engaged to facilitate the attachment of the holder to the instrument board. The upper ends of these vertical tongues or strips 8—8 are bent slightly inwardly as at 12—12 to provide abutments that will strike against the lugs 11—11 of the supporting bar 10 to prevent further downward movement of the holder with respect thereto.

It will thus be seen that I have provided a highly novel, simple, and efficient holder for registration certificates, license tags and the like, that is well adapted to all the purposes heretofore designated, and even though I have herein shown and described the invention as consisting of certain detail structural elements, it is nevertheless to be understood that minor changes may be made therein without effecting the spirit and scope of the appended claim.

Having thus described the invention, what I claim is:—

In a card holder of the class described, a substantially rectangular shaped frame for receiving the card and having an opening in its center through which the card is visible, inwardly extending tongues formed at the intermediate portions of the upper and lower edges of the frame, similar tongues extending inwardly from the side edges of the frame, the upper ends of the side tongues being bent inwardly to provide abutments, a pair of strips removably disposed across the rear face of the card, the ends of said strips engaging a free edge of the upper and lower inwardly directed tongues for retaining the card within the frame, and an elongated supporting bar adapted to be rigidly secured to a support, said bar extending longitudinally of the frame across the outer faces of the vertically disposed card securing strips, the respective ends of the supporting bar being bent to form a pair of offset lugs, said lugs adapted for disposition behind the vertical tongues, the upper edges of said lugs engaging the aforementioned abutments to limit the downward sliding movement of the frame and the card carried thereby.

In testimony whereof I affix my signature.

ROY E. WILLIAMS.